No. 824,562. PATENTED JUNE 26, 1906.
I. N. MILLER.
FENCE POST.
APPLICATION FILED NOV. 1, 1905.
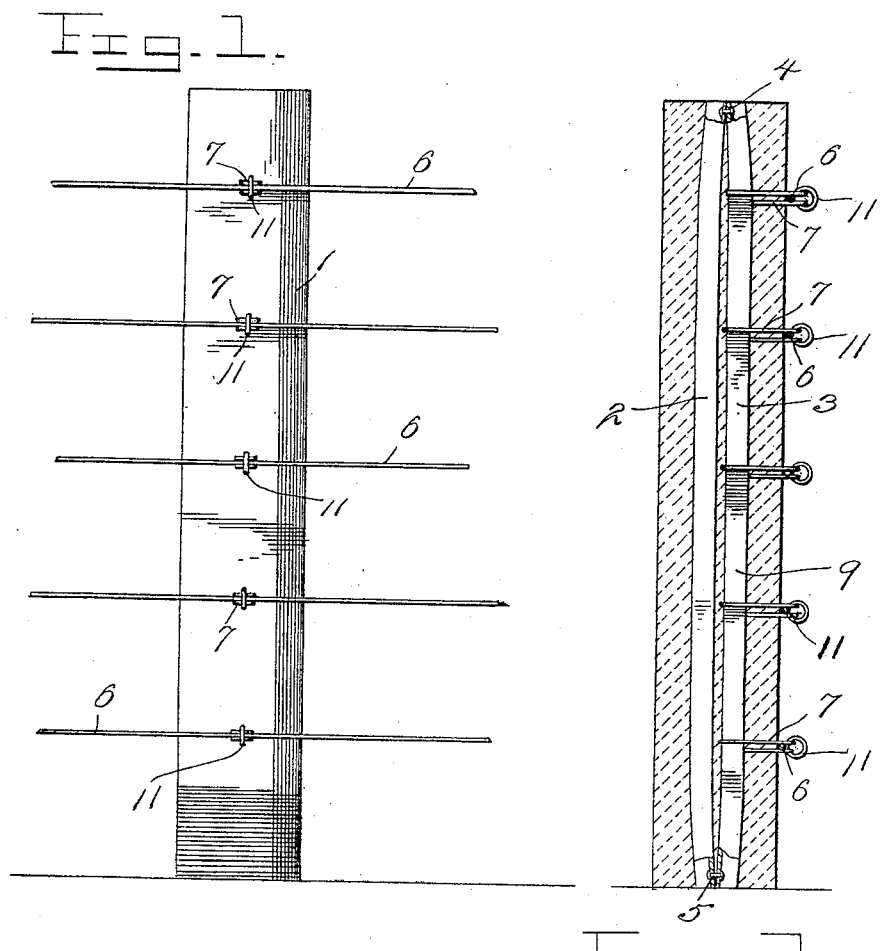
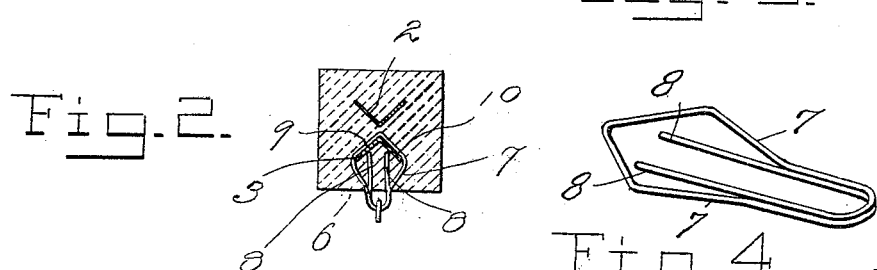

UNITED STATES PATENT OFFICE.

ISAAC N. MILLER, OF SOMERSET, INDIANA.

FENCE-POST.

No. 824,562. Specification of Letters Patent. Patented June 26, 1906.

Application filed November 1, 1905. Serial No. 285,412.

*To all whom it may concern:*

Be it known that I, ISAAC N. MILLER, a citizen of the United States, residing at Somerset, in the county of Wabash, State of Indiana, have invented certain new and useful Improvements in Fence-Posts; and I do hereby declare the following to be a full, clear, and exact description of the invention, such as will enable others skilled in the art to which it appertains to make and use the same.

This invention relates to fence-posts.

One object is to provide a simple, inexpensive, durable, strong, and efficient fence-post.

Another object resides in the provision of a fence-post composed of plastic material and reinforced with metal embedded therein and provided with means for the securing thereto of line-wires.

With these and other objects in view the present invention consists in the combination and arrangement of parts, as will be hereinafter more fully described, shown in the accompanying drawings, and particularly pointed out in the appended claim, it being understood that changes in the form, proportion, size, and minor details may be made within the scope of the claim without departing from the spirit or sacrificing any of the advantages of the invention.

In the drawings, Figure 1 is an elevation of the present invention. Fig. 2 is a transverse section. Fig. 3 is a vertical section with parts in elevation. Fig. 4 is a perspective view of one of the spring-fasteners.

Referring now more particularly to the accompanying drawings, the reference character 1 designates a plastic substance of any character, in which is embedded a pair of metallic strips 2 and 3, which are arranged longitudinally of the plastic material of the post and V-shaped in section. The backs of the reinforcing members 2 and 3 are secured together at the top and bottom, as indicated by the reference characters 4 and 5, and each member is slightly bowed, resulting in a space between them intermediate their ends, as clearly shown in the drawings.

In order to secure the line-wires 6 to the post, I secure a series of spring-fasteners 7 upon either of the reinforcing members 2 or 3. Each of these fasteners 7 consists of a piece of wire having its bight portion bent to conform with the sides of the said reinforcing member, so that it may embrace the latter with its free extremities directed outwardly of the member 3 and then inwardly, as at 8, upon each other within the wings 9 and 10 of the reinforcing member. By reason of these fasteners the line-wires 6 may be inserted between upper and lower inwardly-directed extremities of the corresponding fastener and prevented from displacement therebetween by reason of a suitable ring 11 embracing the upper and lower portions 8 of the fasteners.

From the foregoing it will be understood that the reinforcing members 2 and 3 are embedded in the plastic material 1 and that the fasteners 7 have their inner portions embedded in the plastic material, with their outer portions projecting from beyond, for the engagement therein of the line-wires 6.

What is claimed is—

A fence-post comprising a body portion of hardened plastic material, a pair of oppositely-facing V-shaped metallic reinforcing members embedded therein, the said members being connected together at their top and bottom, and curved outwardly from each other intermediate their ends, and means secured to one of said reinforcing members and having its inner portion bent to conform to the face of said reinforcing member and its outer portion extending beyond one side of the body portion, and means attached to said outer portion for retaining a line-wire in place thereon.

In testimony whereof I affix my signature in presence of two witnesses.

ISAAC N. MILLER.

Witnesses:
LONZO E. SUMPTER,
HORACE G. BOLENS.